April 9, 1963 W. S. BLACKERBY 3,084,495
LAWN MOWER HAVING MAGNET ATTACHED
Filed Jan. 26, 1962

INVENTOR.
WILLIAM S. BLACKERBY
BY *Chas. Denegre*
ATTORNEY

United States Patent Office 3,084,495
Patented Apr. 9, 1963

3,084,495
LAWN MOWER HAVING MAGNET ATTACHED
William S. Blackerby, 7228 2nd Ave. S.,
Birmingham 6, Ala.
Filed Jan. 26, 1962, Ser. No. 168,997
2 Claims. (Cl. 56—255)

This invention relates to a lawn mower having magnet attached. It has for its main object to provide a lawn mower with means for gathering ferrous articles that may be in its path while it is being used.

Further objects are to provide such a combination that will be highly satisfactory for the purpose intended, simple in structure, comparatively cheap to construct, easy to use and keep in working condition, and very durable.

Other objects and advantages will appear from the drawing and specification.

By referring generally to the drawing it will be observed that—

Similar reference numerals refer to similar parts throughout the two views.

Figure 1:
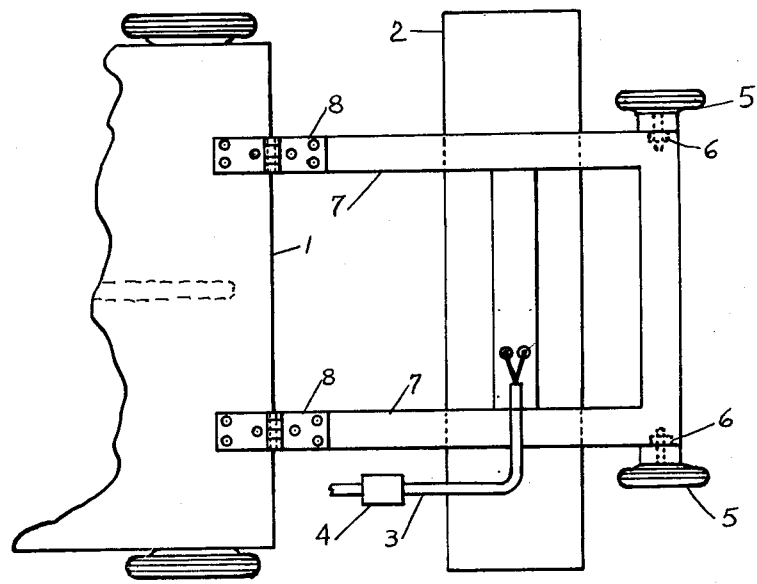
FIG. 1 is a plan view showing the front portion of a lawn mower having a magnet supported in a bracket structure attached according to this invention.
Figure 2:
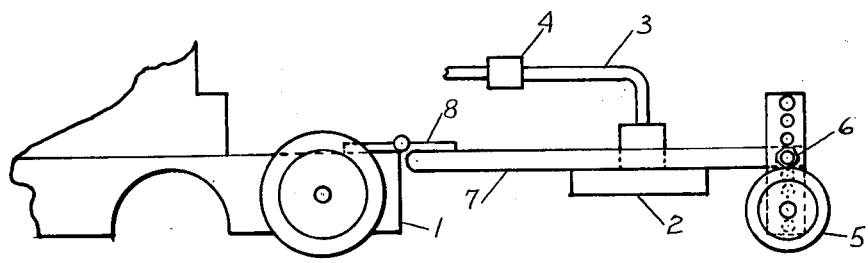
FIG. 2 is a side elevational view of the parts shown in FIG. 1

Referring to the drawing in detail it will be seen that the combination comprises a lawn mower 1 having an electric magnet 2 with electric source connecting wires 3 with a suitable switch 4. Wheels 5 with suitable nuts and bolts 6 are connected to the bracket carrier 7 that is attached by hinges 8 to the front of the lawn mower.

From the foregoing it will appear that the magnet is moved along in front of the lawn mower when it is being used, and may be lowered or raised by use of the connecting bolts that attach it to its carrying structure and that it will attract and hold ferrous articles such as nails, pieces of wire and the like to prevent such from coming into contact iwth the revolving blade of such a lawn mower and prevent the articles from being thrown outward and liable to cause injury to a person near.

The various parts of the structure may be made of any material suitable for the purpose, but I prefer to use good grades of metal and electric connections and an electric type magnet, but any type of magnet may be used. Also the parts may be made in different sizes and capacities depending on the sizes of lawn mowers on which to be used.

While I have shown and described the preferred embodiment of my invention, I do not wish to limit same to the exact and precise details of structure, and I reserve the right to make all modifications and changes so long as they remain within the scope of the invention and the following claims.

Having described my invention, I claim:

1. A lawn mower having a magnet attached comprising, a horizontally revolvable type blade, two hinges, these hinges being mounted on the front of the lawn mower, a bracket structure with two side parts and a front part integral with the side parts, the ends of the side parts being attached to said hinges, a magnet, this magnet being attached to and supported by said side parts of the bracket, two wheels, these wheels being attached opposite each other on the front connecting part of the bracket, adjusting means with nuts and bolts, these means and nuts and bolts being adapted for adjusting the magnet under face with reference to its distance from surface over which it is being used by attaching the said front part of the bracket to its wheels.

2. A lawn mower having an electro magnet attached comprising, a horizontally revolvable type blade, two hinges, these hinges being mounted on the front of the lawn mower, an oblong shaped bracket made of flat non-ferrous metal and having two side parts and a front part integral with ends of the side parts, the other two ends of the side parts being attached to said hinges, an electro type magnet, this magnet being attached to the under face of said side parts of the bracket, two similar wheels, these wheels being attached opposite each other on the front connecting part of the bracket, bolt and nuts as adjusting means and a plurality of holes, supporting bracket parts for said wheels, said supporting parts having the holes therethrough, said adjusting means adapted for using said holes for regulating the distance of the under face of the magnet from the ground surface over which it is being used; electric supply wires having a switch control, these wires being connected to said magnet for use and under control of said switch.

References Cited in the file of this patent

UNITED STATES PATENTS

| | | |
|---|---|---|
| 2,288,115 | Soldanels | June 30, 1942 |
| 2,293,664 | Roberts | Aug. 18, 1942 |
| 2,751,741 | Carson | June 26, 1956 |